(12) United States Patent
Enami et al.

(10) Patent No.: US 7,043,646 B2
(45) Date of Patent: May 9, 2006

(54) ELECTRONIC DEVICE WITH PLURAL INTERFACE PORTS WHEREIN ONE OF THE INTERFACE PORTS IS USED AS AN ASSIST POWER SUPPLY PORT

(75) Inventors: Katsuya Enami, Sayama (JP); Hiroomi Watanabe, Iruma (JP); Yuuki Suzuki, Beppu (JP)

(73) Assignee: TEAC Corporation, Tokyo (JP)

( * ) Notice: Subject to any disclaimer, the term of this patent is extended or adjusted under 35 U.S.C. 154(b) by 0 days.

(21) Appl. No.: 10/076,593

(22) Filed: Feb. 19, 2002

(65) Prior Publication Data
US 2004/0221180 A1    Nov. 4, 2004

(30) Foreign Application Priority Data
Mar. 29, 2001   (JP) .............................. 2001-097321

(51) Int. Cl.
  *G06F 1/26*   (2006.01)

(52) U.S. Cl. ..................... 713/300; 713/330; 713/340
(58) Field of Classification Search ................ 713/300, 713/330, 340; 714/313; 710/313
See application file for complete search history.

(56) References Cited

U.S. PATENT DOCUMENTS

| | | | |
|---|---|---|---|
| 6,105,097 A * | 8/2000 | Larky et al. ................. | 710/314 |
| 6,210,216 B1 * | 4/2001 | Tso-Chin et al. ........... | 439/545 |
| 6,283,789 B1 * | 9/2001 | Tsai ........................... | 439/502 |
| 6,578,152 B1 * | 6/2003 | Burnside .................... | 713/300 |

FOREIGN PATENT DOCUMENTS

| | | | |
|---|---|---|---|
| JP | 2001043178 A | * | 2/2001 |
| JP | 2002-099362 A | | 4/2002 |

OTHER PUBLICATIONS

Lynn et al, Universal Sirial Bus (USB) Power Management, Apr. 1997, IEEE, pp. 434-441.*

* cited by examiner

*Primary Examiner*—Chun Cao
*Assistant Examiner*—Suresh K Suryawanshi
(74) *Attorney, Agent, or Firm*—Christensen O'Connor Johnson Kindness PLLC

(57) ABSTRACT

A CD-R drive has two USB ports. One USB port is connected as an ordinary interface port to a host computer by a USB cable, and the other USB port is connected as an assist power supply port to the host computer by another USB cable. With this arrangement, the CD-R drive can operate with maximum current consumption of 1.0 A without using a separate AC power supply adapter because each USB port allows passage of 500 mA of current at maximum.

20 Claims, 7 Drawing Sheets

ELECTRONIC DEVICE WITH PLURAL INTERFACE PORTS WHEREIN ONE OF THE INTERFACE PORTS IS USED AS AN ASSIST POWER SUPPLY PORT

BACKGROUND OF THE INVENTION

1. Field of the Invention

The present invention relates generally to electronic devices equipped with an interface such as a Universal Serial Bus (USB), and more particularly to improvements in the power supply to such electronic devices.

2. Description of the Related Art

Various electronic devices having a USB port are known heretofore. These devices are widely used as a mouse, a keyboard, a CD-ROM (Compact Disk Read-only Memory) drive, a CD-R/RW (Compact Disk Recordable/Rewritable) drive, a MO (Magneto-optic) drive and a DVD (Digital Versatile Disk) drive.

The USB interface enables not only data communication between a host machine and a peripheral device but also the supply of electric power from the host machine to the peripheral device. This interface defines lower-power devices with maximum current consumption of 100 mA and high-power devices with maximum current consumption of 500 mA.

Due to such limited maximum current value (500 mA) of the USB interface, devices consuming more power than is admitted (i.e., devices requiring more current than 500 mA) through a single USB port need installation of an extra power supply such as an AC power supply adapter or a battery, which will require an additional power supply circuit and accessories.

However, as the device performance has been significantly improved in recent years, the demand for a space-spacing and cost-reducing device has increased greatly. Especially, there is a keen demand for a device which can operate with current consumption greater than 500 mA so as to realize various functions without using a separate AC power supply adapter or special accessories.

SUMMARY OF THE INVENTION

With the foregoing in view, it is an object of the present invention to provide an electronic device that can readily draw or consume more current than is admitted (500 mA) through a single USB port.

To achieve the foregoing object, according to the present invention, there is provided an electronic device having an interface for data transfer composed of a signal line and a power supply line with a limited maximum allowable current, characterized in that the electronic device has at least two ports of the interface, and the electronic device as a whole is adapted to operate with more current consumption than is admitted through a single port of the interface.

In one preferred form of the present invention, the electronic device has two or more interface ports, such as USB ports. The interface has specifications that maximum current consumption up to 500 mA is permitted only when configuration operation with respect to the host computer has completed. The electronic device further comprises a device controller connected to each of the interface ports, a disk drive body connected to the device controller, and a power supply control switch connected between each respective power supply line of the interface ports and a power supply line of the disk drive body. The device controller performs on-control of the power supply control switches only when current consumption compatible to a high power device is permitted to each of the USB ports as a result of configuration achieved between the device controller and the host computer.

In another preferred form of the present invention, at least a part of functions of the disk drive body is limited until when permission for high power function is given from the host computer to every USB port. With such permission given to every USB port, all of the functions of the disk drive body can be used.

The term "high power function" is used herein to refer to a condition in which in a USB device supplied with power through a power supply line of the USB interface (i.e., bus-powered USB device), current consumption in excess of 500 mA is permitted as a result of configuration achieved between the USB device and the host computer. The high power function is a declaration from the USB device to the host computer and when this function is permitted, the USB device can operate at a maximum current value of 500 mA.

The electronic device may comprise a recordable optical disk drive in which instance the function, which is limited until the high power function is permitted by the host computer, is preferably a write operation. As an alternative, at least part of the functions of the disk drive body may be used with limited performance, for example, by decreasing the rotational speed of a disk.

Differing from the conventional devices in which power is supplied through a single USB port, the electronic device according to the present invention has at least two USB ports, one serving as an ordinary interface port and the other as an assist power supply port. This arrangement ensures that power is supplied simultaneously through the plural ports to the electric device. Thus, even though the maximum allowable current for each USB port is specified as 500 mA, the electronic device of the invention, if provided with two USB ports, can use a current of 1.0 A at maximum. This obviates the need for a separate AC power supply adapter as long as the device operates with current consumption below 1.0 A.

The interface and assist power supply functions assigned to the respective USB ports may be fixed, or alternately changed depending on the order of connection with respect to the host computer. In the latter case, the USB port designated to have an assist power supply function, as opposed to the ordinary interface USB port, is not required to undertake substantive data transmission and reception with respect to the host computer and is allowed to perform only the assist power supply function. Thus, configuration is achieved such that the host computer recognizes this USB port as a device with no operating feature. The device thus recognized is hereinafter referred to as "dummy device".

The two USB ports of the device may be theoretically combined to form a single interface for the purpose of improving the data transfer speed. For the same purpose, several techniques are well known in the art, including Integrated Services Digital Network (ISDN) 2B Mode and Serial Line Load Balancing.

BRIEF DESCRIPTION OF THE DRAWINGS

Certain preferred embodiments of the present invention will now be described in detail, by way of example only, with reference to the accompanying drawings, in which.

DETAILED DESCRIPTION OF THE PREFERRED EMBODIMENTS

The following description is merely exemplary in nature and is in no way intended to limit the invention or its application or uses.

Figure 1:
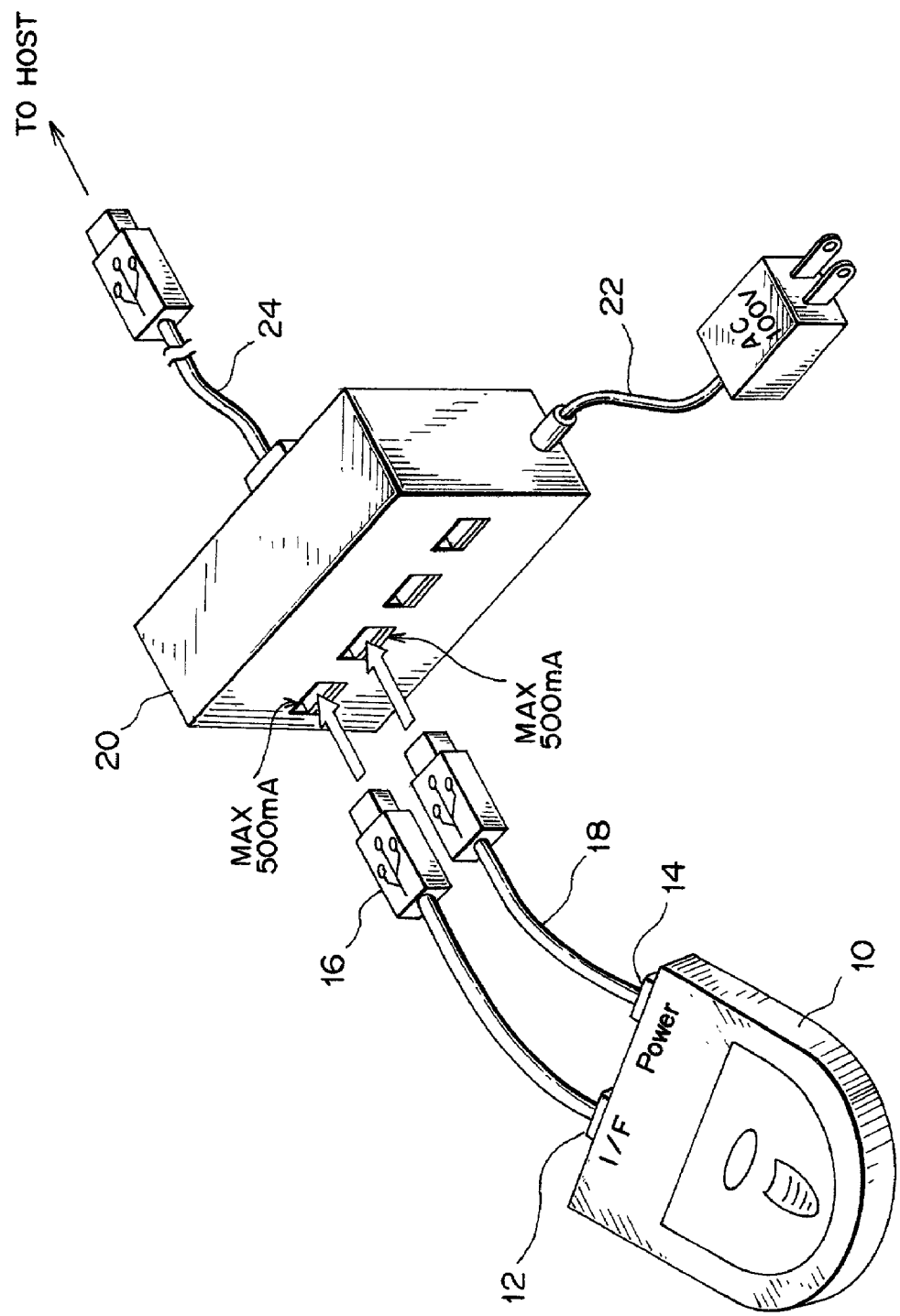
FIG. 1 is a schematic perspective view illustrative of the manner in which an electronic device according to a first embodiment of the present invention is connected to a host.

FIG. 1 shows an electronic device with USB ports according to a first embodiment of the present invention, the device taking the form of a CD-R (Compact Disk Recordable) drive 10.

The CD-R drive 10 has a USB port 12 for interface and a USB port 14 for assist power supply. The interface port 12 and the assist power supply port 14 receive respectively therein connectors (not shown) at respective one end of two USB cables 16 and 18. Connectors at respective opposite end of the USB cables 16, 18 are inserted into USB ports of a hub 20. The hub 20 is equipped with an AC power supply adapter 22 and is connected by a USB cable 24 to a host computer 26 (FIG. 2).

The USB cables 16, 18 each carry a maximum current of 500 mA. In the illustrated embodiment, since two USB cables 16, 18 are connected to the same CD-R drive 10, current that can be drawn or consumed by the CD-R drive 10 increases up to 1.0 A (500 mA+500 mA). The CD-R drive 10 may be directly connected to two USB ports of the host computer without using the hub 20.

Figure 2:
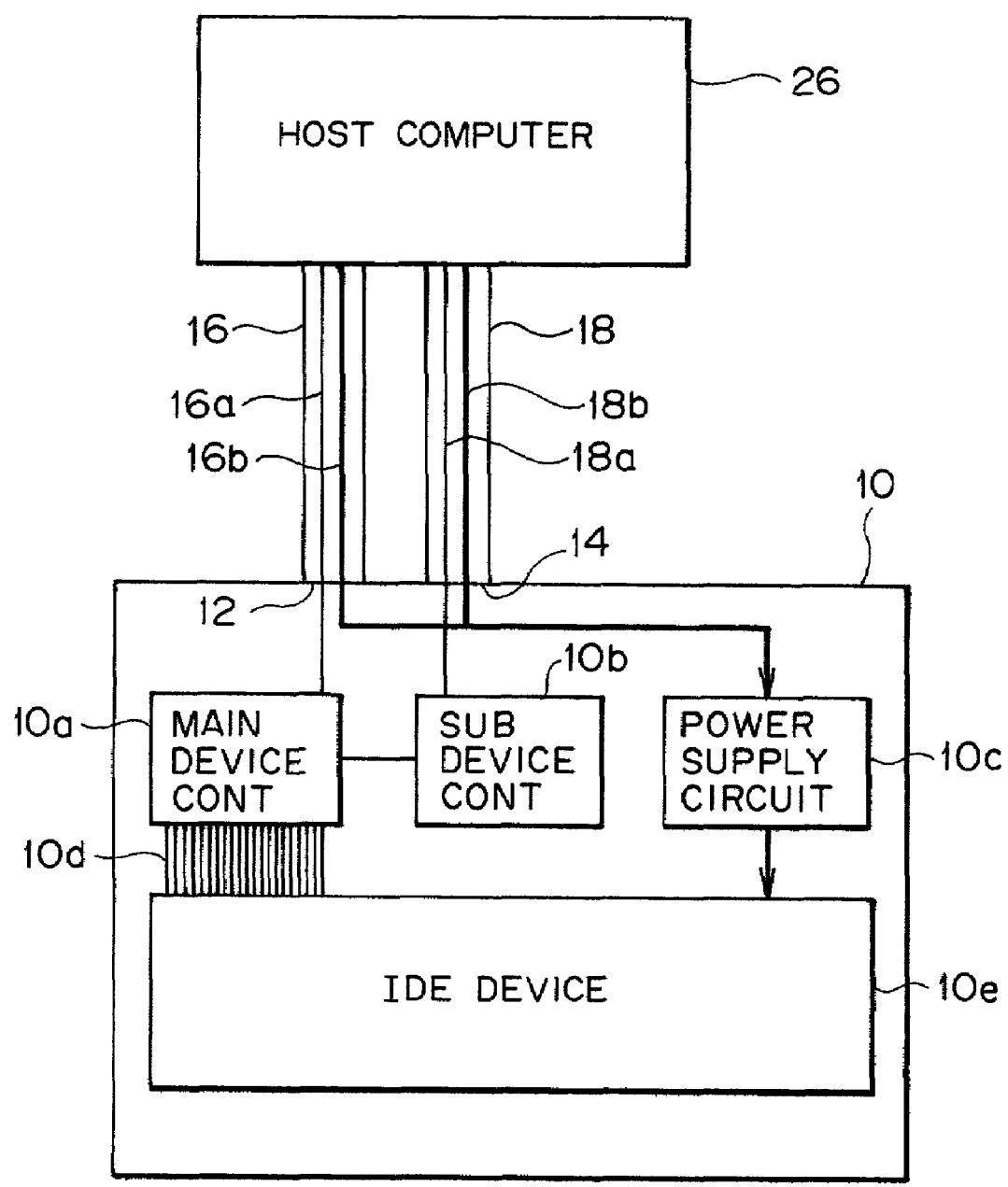
FIG. 2 is a block diagram showing the electronic device of FIG. 1 as it is connected to a host computer.

FIG. 2 shows in block diagram an arrangement in which the USB ports 12, 14 of the CD-R drive 10 are directly connected to the host computer 26.

As show in FIG. 2, the CD-R drive 10 includes, additional to the USB ports 12, 14, a main device controller 10a, a sub device controller 10b, a power supply circuit 10c and an IDE (Integrated Drive Electronics) device (CD-R device in the illustrated embodiment) 10e.

The interface port 12 is connected to the main device controller 10a, and the assist power supply port 14 is connected to the sub device controller 10b. The main device controller 10a is connected via an IDE interface 10d to the IDE device 10e so as to control operation of the IDE device 10e. The main device controller 10a is interactively connected by a data line (not designated) to the sub device controller 10b, so that operation of the sub device controller 10b is also controlled by the main device controller 10a.

The USB cables 16, 18 each have a data line (or signal line) 16a, 18a and a power supply line 16b, 18b. With the USB cable 16 plunged into a USB port of the host computer 26, the main device controller 10a and the host computer 26 are connected together through the data line 16a and the power supply line 16b. Through the data line 16a, the main device controller 10a transmits data, like ID (identification) data, to the host computer 26 and receives data from the host computer 26. After the connection is acknowledged, the main device controller 10a can drive the IDE device 10e in an appropriate manner according to a read command or a write command supplied from the host computer 26. Through the power supply line 16b of the USB cable 16, the main device controller 10a can draw or consume a maximum current of 500 mA. On the other hand, when the USB cable 18 is plunged into another USB port of the host computer 26, the sub device controller 10b of the CD-R drive 10 and the host computer 26 are connected together via the data line 18a and the power supply line 18b. Through the data line 18a, the sub device controller 10b transmits ID data to the host computer 26 for causing the host computer 26 to recognize a dummy device. After configuration operation, the host computer 26 recognizes that the dummy device is a "virtual bus-powered device" that needs current consumption up to 500 mA and does no perform substantive data transmission/reception.

This forms a clear contract to the main device controller 10a, which causes the host computer to recognize the IDE device 10e as an "actual bus-powered device". The term "bus-powered device" represents a device drivable only by power that can be obtained from the USB power supply line. After recognition of the dummy device, the data line 18a of the USB cable 18 does not undertake substantive data transmission and reception with respect to the IDE device 10e, so that the USB cable 18 as a whole thereafter undertakes current carrying operation for supplying current up to 500 mA through the power supply line 18b.

The respective power supply lines 16b, 18b of the USB ports 12, 14 are connected to the power supply circuit 10c installed in the CD-R drive 10. With this arrangement, the sum of the currents flowing through the power supply lays 16b, 18b is supplied to the power supply circuit 10c and thence to the IDE device 10e.

By thus receiving power from the host computer 26 through the two ports 12 and 14, the CD-R drive 10 in the illustrated embodiment can operate with maximum current consumption of 1.0 A (500 mA+500 mA).

Figure 8:
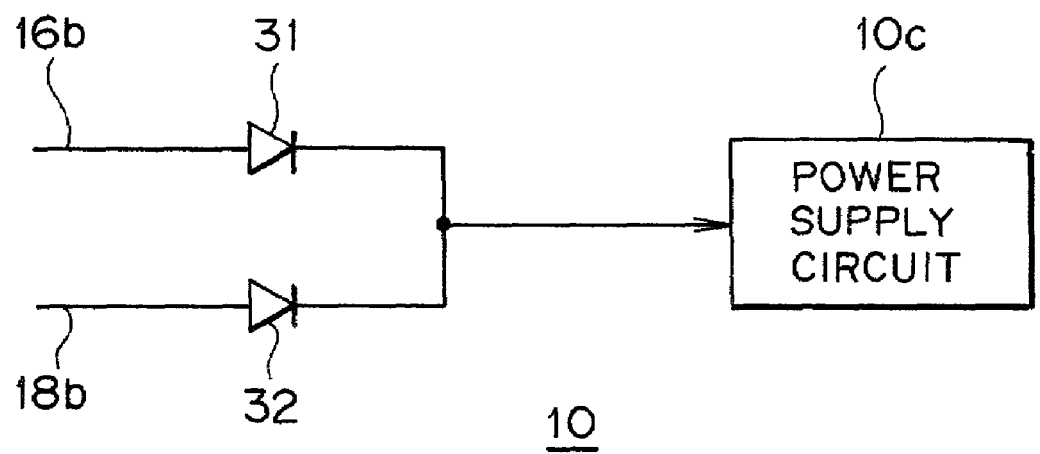
FIG. 8 is a circuit diagram of a portion of the electronic device shown in FIG. 2.

Between each respective power supply line 16b, 18b and the power supply circuit 10c, there is provided a diode 31, 32 which, as shown in FIG. 8, is arranged to prevent current from flowing reversely, thereby protecting the USB hub 20 (FIG. 1) or the host computer 26 against damage.

Figure 3:
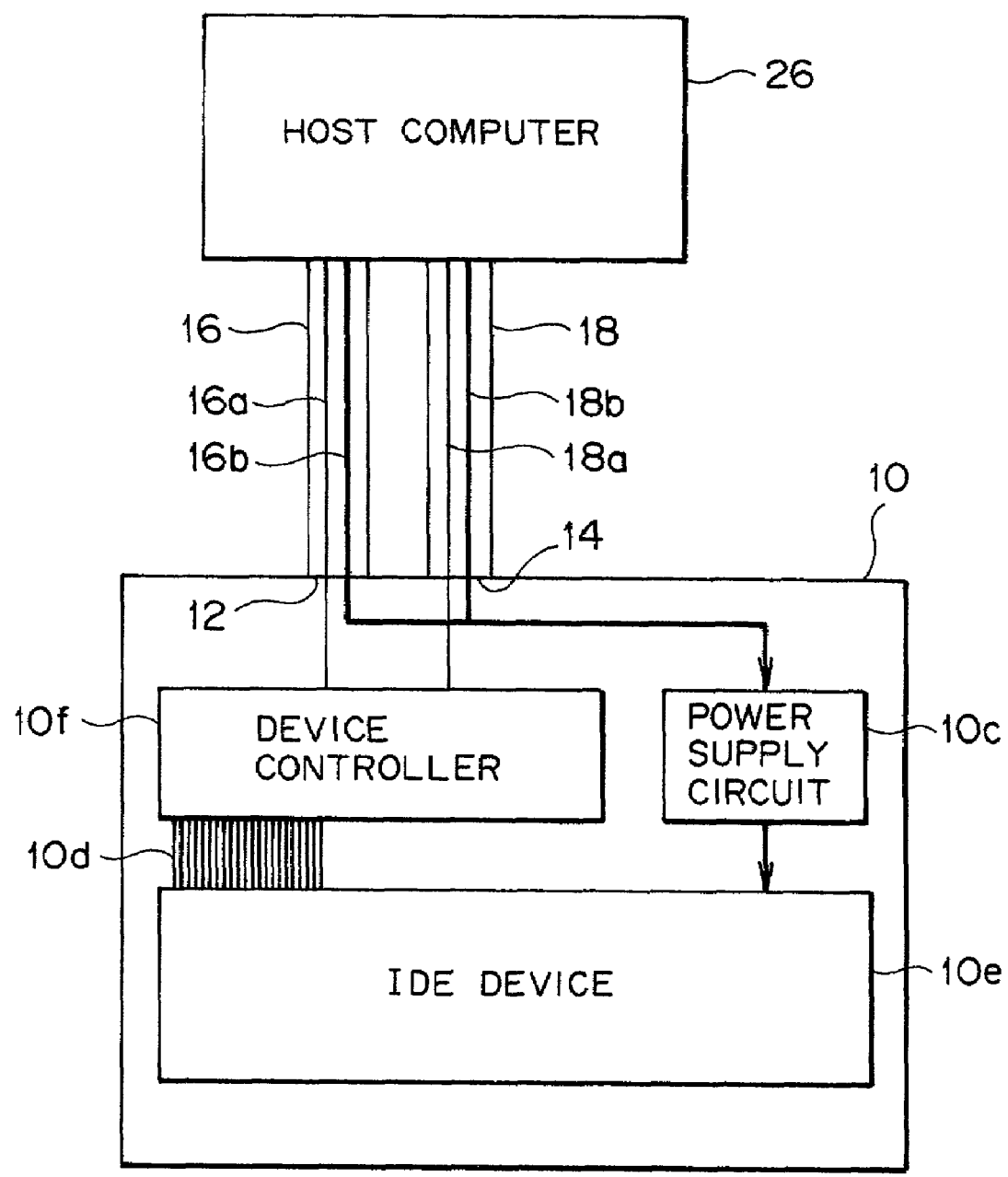
FIG. 3 is a view similar to FIG. 2, but showing a modified arrangement of the electronic device.

In the embodiment described above, the USB ports 12 and 14 are connected to the device controllers 10a and 10b, respectively. According to a modification of the present invention, the device controllers 10a, 10b may be replaced with a single device controller 10f connected with two USB ports 12 and 14, as shown in FIG. 3. In the modified arrangement shown in FIG. 3, the device controller 10f transmits configuration data such as IDs through the USB port 12 and a USB cable 16 to the host computer 26 and also transmits configuration data through the USB port 14 and a USB cable 18 to the host computer 26.

The main and sub device controllers 10a, 10b or the device controller 10f constitutes a control means of the electronic device 10. The CD-R device 10e constitutes a body portion of the electronic device (CD-R drive) 10. Similarly, the power supply circuit 10c constitutes a power supply control means of the electronic device 10. The host computer 26 constitutes external equipment having a power supply function.

Figure 4:
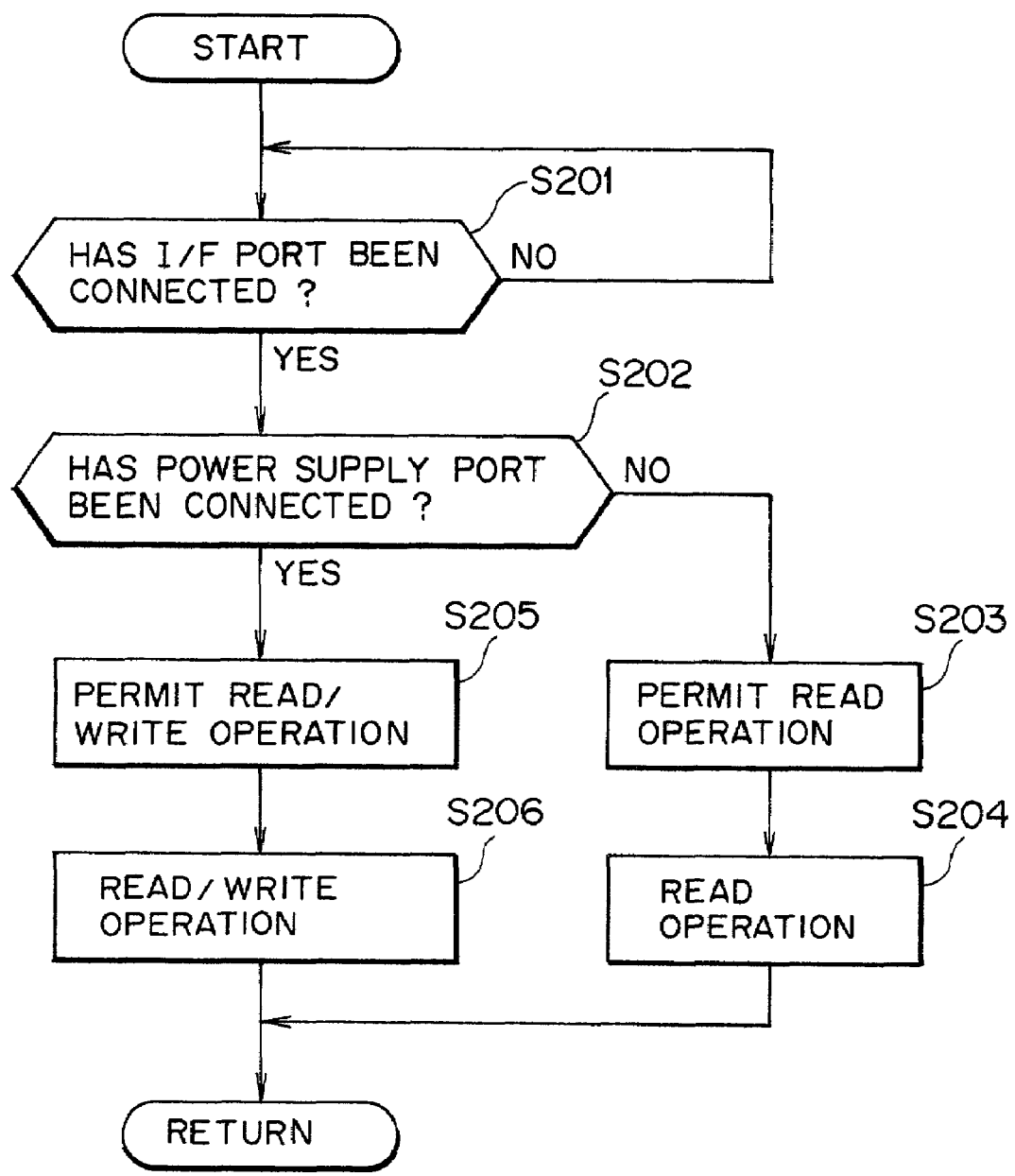
FIG. 4 is a flowchart used for explaining operations of the electronic device.

Operation of the CD-R drive 10 shown in FIG. 2 is described in greater detail with reference to a flowchart shown in FIG. 4. As shown in this figure, the flow chart begins with a step S201 at which the main device controller 10a forms a judgment as to whether the interface port 12 has been connected to the host computer 26. In the case where the interface port 12 has been connected to the host computer 26, the main device controller 10a transmits configuration data about the CD-R drive 10 to the host computer 26, thereby causing the host computer 26 to recognize the CD-R drive 10. To be important to note that when a connection established between a USB device (like the CD-R drive 10) and the host computer 26 through the USB cable 16 is acknowledged, low power function is permitted for the USB device to operate with current consumption up to 100 mA; and only when the host computer 26 permits high-power function as a result of the configuration operation, the USB device is allowed to operate with current consumption up to 500 mA.

Figure 5:
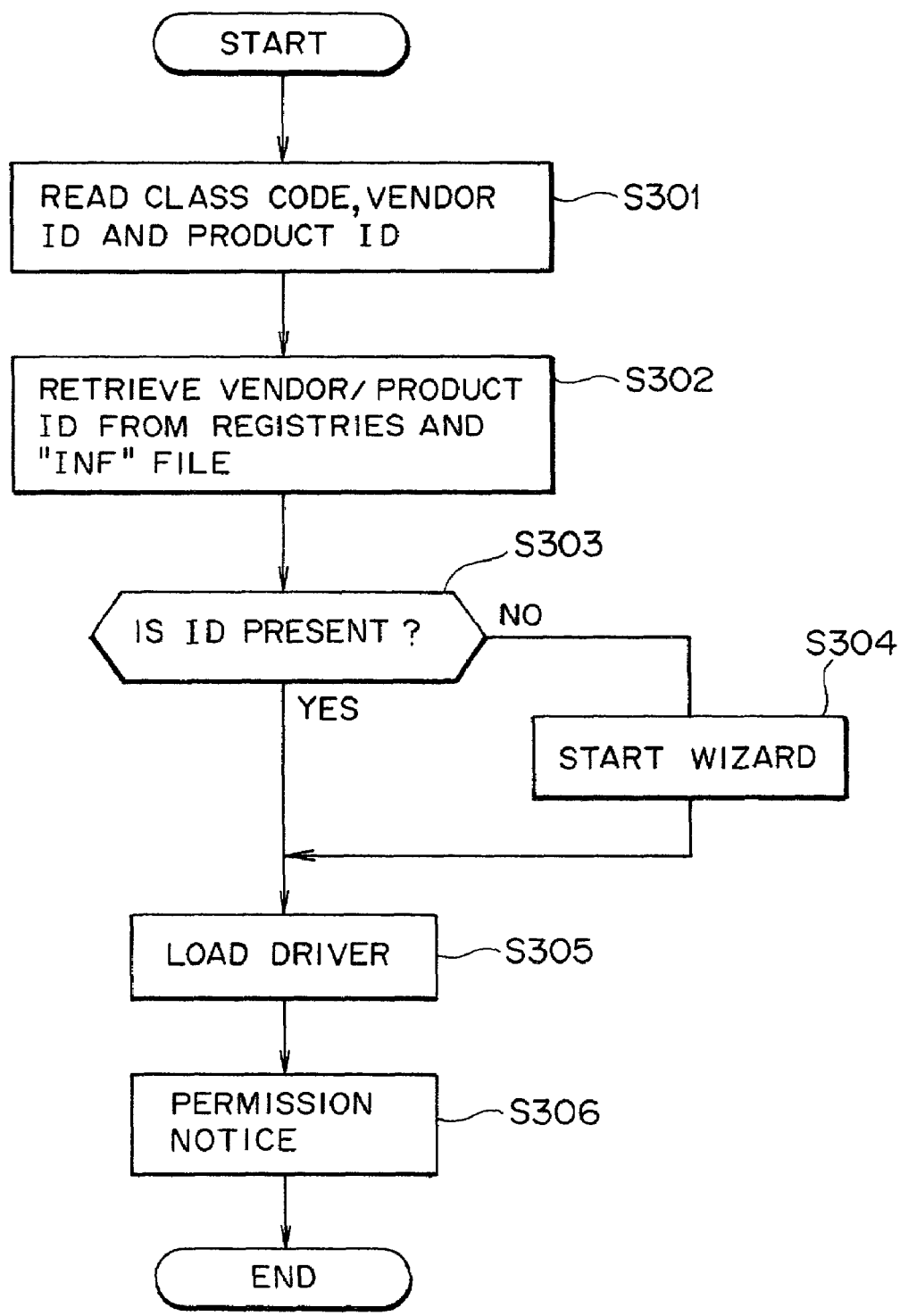
FIG. 5 is a flowchart used for explaining operations carried out by the host computer to check a connection between each respective port of the electronic device and the host computer.

FIG. 5 is a flowchart used for explaining processing which is carried out by the host computer 26 to recognize the CD-R drive 10 when a connection between the port 12 and the host computer 26 has been established by the USB cable 16. As shown in this figure, the flowchart begins with a step S301 at which the main device controller 10a transmits configuration data composed of a Class Code, a Vendor ID and a Product ID to the host computer 26, and the host computer 26 reads these data items. The Class Code is a kind of ID that identifies a class of the device. The Vender ID is an ID that identifies a vender of the device. The Product ID is an ID specified by the Vender to identify the product. Here, the Vender ID and Product ID are assumed to be "0X644" and "1234", respectively.

The flow of processing then goes on to a step S302 where the corresponding Vender and Product IDs are retrieved from registries, Inf files, or a like kind of configuration files/data incorporated in an operating system (OS) of the host computer 26.

Then, at a subsequent step S303 of the flowchart, the host computer 26 forms a judgment as to whether or not there exist appropriate IDs. If the outcome of the judgment formed at step S303 indicates the presence of appropriate IDs, the flow of processing goes on to a step S305 where a standard driver software for the CD-R drive 10, which is provided in advance in the OS, is loaded. This means that identification of the CD-R drive 10 has completed. Then, at a subsequent step S306, a notice of permission is supplied from the host computer 26 to the CD-R drive 10 whereby high power function is permitted for the CD-R drive 10. The CD-R drive 10 is thus allowed to operate with current consumption up to 500 mA.

If the outcome of the judgment formed at step S303 indicates the absence of appropriate IDs, the flow of processing branches to a step S304 where wizard software for new devices is initiated, asking the user to install appropriate driver software. When the user inputs data about the appropriate driver software from a floppy disk or a CD-ROM, the host computer 26 loads the input driver software, as at step S305. Subsequently at step S306, with the understanding that recognition of the CD-R drive 10 has completed, the host computer 26 providers a permission notice to the CD-R drive 10. In this way, the host computer 26 recognizes the CD-R device.

Turning back to FIG. 4, if the outcome of the judgment formed at step S201 indicates that the interface port 12 has been connected to the host computer 26, the flow of processing goes on to a step S202 where the main device controller 10a forms a judgment as to whether or not the assist power supply port 14 has been connected to the host computer 26. This judgment is achieved essentially in the same manner as described above with reference to FIG. 5. However, by a command or instruction received from the main device controller 10a, the sub device controller 10b operates to transmit configuration data to the host computer 26. The configuration data is prepared to cause the host computer 26 to recognize the CD-R drive 10 as a dummy device with high power function and thus undertake power supply operation only. To this end, the same data as used for transmission from the port 12 is used for a Class Code and a Product ID, while a different Product ID from the one used for identifying the CD-R drive 10 is used. Stated more specifically, the Vender ID is set to "0X644" and the Product ID is set to "1235". Based on the configuration data, driver software specialized for the power supply is loaded, whereby the high power function is permitted. When the CD-R drive 10 connected through the port 14 to the host computer 26 is recognized as a dummy device with high power operation and hence the high power function is permitted, the sub device controller 10b notifies this permission to the main device controller 10a. With this permission notice, the USB port 14 is allowed to pass a maximum current of 500 mA. Thus, the CD-R drive 10 as a whole can operate with maximum current consumption of 1.0 A.

If the outcome of the judgment formed at step S202 indicates that the port 14 has been connected to the host computer 26, this means that both ports 12 and 14 have been connected to the host computer 25. The flow of processing then goes on to a step S205 where the main device controller 10a permits both read and write operations. Thus, at a subsequent step S206, the CD-R drive 10 operates to read data from a CD or write data to the CD according to a command or instruction received from the host computer 26. In general, the recording operation (write operation) requires more loading power than the reproducing operation (read operation) and needs current in excess of 500 mA. In the illustrated embodiment, however, since a maximum current of 1.0 A is available by virtue of the provision of dual ports 12 and 14, the write operation can be achieved stably and reliably.

If the outcome of the judgment formed at step S202 indicates that the port 14 has not been connected to the host computer 26, this means that a maximum available current is 500 mA as supplied through the port 12. The flow of processing then branches to a step S203 where the main controller 10a permits read operation only. Thus, at a subsequent step S204, only a read operation is carried out, reproducing data recorded on the CD. In this condition, if the user attempts to achieve a write operation, the main device controller 10a will return an error command to instruct the host computer 26 to provide an error message to the user.

Figure 6:
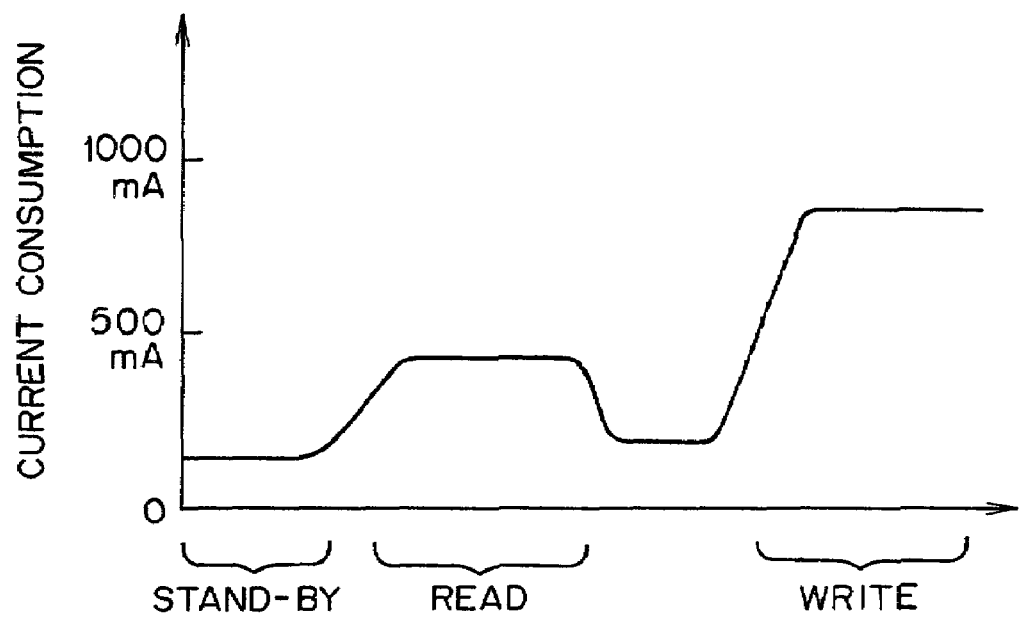
FIG. 6 is a graph showing changes in the current consumption occurring in the illustrated embodiment.

FIG. 6 is a graph showing changes in the current consumption occurring when the device (CD-R drive) 10 of the foregoing embodiment is operating. In the stand-by state, the current consumption achieved through the port 12 is 100 mA (or 200 mA when the port 14 has been also connected to the host computer 26). During the read operation, the current consumption goes up to 500 mA. During the write operation, the current consumption achieved through both ports 12 and 14 reaches to 1000 mA (=1.0 A).

As is apparent from the foregoing description, the CD-R drive 10 embodying the present invention has two USB ports 12, 14 arranged to increase the maximum value of current consumption from 500 mA to 1.0 A. By thus arranging the USB ports 12, 14, it is readily possible for the CD-R device 10 to achieve the write operation (or like operations involving increased current consumption) without using a separate AC power supply adapter.

Stated in other words, the electronic device according to the present invention can operate with more power (or current consumption) than is admitted through a single standard USB port without using a separate AC power supply adapter.

Although certain preferred embodiments of the present invention have been disclosed and described, it is apparent that other embodiment and modification of the invention are possible. For example, while two USB ports are provided in the illustrated embodiments, three or more USB ports may be employed. If the number of the ports is given by n, then the maximum current consumption is represented by 500 mA×n. In this instance, each of the ports may be controlled by one device controller as shown in FIG. 2, or alternately, all ports may be controlled by a single device controller as shown in FIG. 3.

In the illustrated embodiments, when only the port 12 has been connected to the host computer 26, the read operation is permitted alone, and when both ports 12 and 14 have been connected to the host computer 26, both read and write operations are permitted. It is possible, according to the present invention, to permit a low-speed read/write operation when only the port 12 has been connected to the host computer 26 and also to permit a high-speed read/write operation when both ports 12, 14 have been connected to the host computer 26.

Furthermore, in the illustrated embodiments, a connection between each respective port 12, 14 and the host computer 26 is checked in the order of the interface port 12 and the assist power supply port 14. This order of checking may be reversed in which instance when a connection established between the interface port 12 and the host computer 26 is confirmed, all functions including write operation of the CD-R drive 10 become available.

In the illustrated embodiments, the port 12 is used for interface and the port 14 is used for assist power supply. The relation between the ports 12, 14 and the functions assigned thereto should by no means be limited to the illustrated embodiments but may be changed according to the order of connection between the ports 12, 14 and the host computer 26. For instance, in the modified embodiment shown in FIG. 3, two ports 12 and 14 are connected with a single device controller 10f. In this arrangement, the device controller 10f recognizes that one port first connected to the host computer 26 is an interface port and the other port (or another port, if more than three ports are provided) subsequently connected to the host computer 26 is an assist power supply port. Based on this recognition, the device controller 10f transmits configuration data to the host computer 26. As an alternative, it is possible for the device controller 10f to recognize one port first connected to the host compute as an assist power supply port and the other port (or another port) later connected to the host computer 26 as an interface port.

Figure 7:
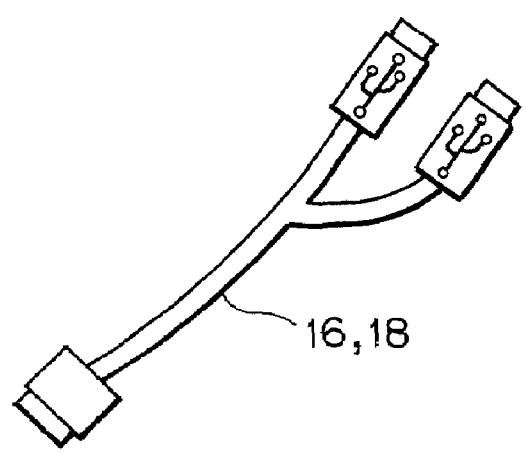
FIG. 7 is a schematic plan view of a modified USB cable.

Furthermore, in the illustrated embodiments, the two USB ports 12, 14 are physically separated, as shown in FIG. 1. These ports 12, 14 may be arranged in close juxtaposition in the horizontal or vertical direction so as to form a single integrated port. In this instance, a bifurcated USB cable shown in FIG. 7 as having a single connector at one end may be used in combination with the single port.

While the description has been made to the CD-R drive as a typical electronic device, the present invention can be also applied to DVD drives and MO drives. Additionally, the interface of the present invention should by no means be limited to the USB interface, but may include an IEEE1394 interface.

What is claimed is:

1. An electronic device, comprising:
an interface for data transfer including a signal line and a power supply line with a limited maximum allowable current, said interface allowing the supply of predetermined electric power to the electronic device from external equipment with power supply function only when predetermined communication is performed between the electronic device and the external equipment via the interface, and wherein said electronic device is adapted to operate with more current consumption than is provided for through a single port of said interface;
said electronic device further comprising:
at least two ports being included as part of the interface;
control means connected to each of said at least two ports of the interface;
a body portion connected to said control means; and
power supply control means connected between each respective power supply line of said at least two ports of the interface and a power supply line of said body portion,
wherein said control means turns on said power supply control means to thereby permit operation of the electronic device only when the supply of predetermined electric power through each of said at least two ports of the interface is confirmed as a result of communication between said control means and the external equipment.

2. An electronic device, comprising:
an interface for data transfer including a signal line and a power supply line with a limited maximum allowable current, said electronic device allowing the supply of predetermined electric power to the electronic device from an external equipment only when predetermined communication is performed between the electronic device and the external equipment;
at least two interface ports;
control means connected to each of said at least two interface ports; and
a body portion connected to said control means;
wherein said control means, on the basis of the result of communication with the external equipment, controls said body portion in such a manner that at least part of functions of said body portion can not be used until the supply of predetermined electric power through each of said at least two ports of the interface is confirmed, and all of the functions of said body portion become available only when the supply of predetermined electric power through each of said at least two ports of the interface is confirmed.

3. An electronic device, comprising:
an interface for data transfer including a signal line and a power supply line with a limited maximum allowable current, said electronic device allowing the supply of predetermined electric power to the electronic device from an external equipment only when predetermined communication is performed between the electronic device and the external equipment;
at least two interface ports;
control means connected to each of said at least two interface ports; and
a body portion connected to said control means;

wherein said control means, on the basis of the result of communication with the external equipment, controls said body portion in such a manner that at least part of functions of said body portion can be used only with limited performance until the supply of predetermined electric power through each of said at least two ports of the interface is confirmed, and all of the functions of said body portion become available without limitations only when the supply of predetermined electric power through each of said at least two ports of the interface is confirmed.

4. The electronic device according to claim 1, wherein said interface has specifications that the supply of predetermined electric power to the electronic device from an external equipment with power supply function is permitted only when predetermined communication is performed between the electronic device and the external equipment via the interface, and wherein said body portion connected to said control means is adapted to perform substantive data transmission and reception with respect to the external equipment, said substantive data transmission and reception between said body portion and the external equipment being carried out through one of said at least two ports of the interface.

5. The electronic device according to claim 1, wherein said body portion comprises an information storage device.

6. The electronic device according to claim 2, wherein said body portion comprises an information storage device.

7. The electronic device according to claim 3, wherein said body portion comprises an information storage device.

8. The electronic device according to claim 4, wherein said body portion comprises an information storage device.

9. The electronic device according to claim 2, wherein said body portion comprises a disk recording and reproducing device, and said at least part of the functions is a data recording function.

10. The electronic device according to claim 3, wherein said body portion comprises a disk recording and reproducing device, and said at least part of the functions with limited performance is disk rotation speed.

11. The electronic device according to claim 1, wherein said interface is a USB interface, said predetermined communication is a configuration operation, and said control means comprises a device controller.

12. The electronic device according to claim 2, wherein said interface is a USB interface, said predetermined communication is a configuration operation, and said control means comprises a device controller.

13. The electronic device according to claim 3, wherein said interface is a USB interface, said predetermined communication is a configuration operation, and said control means comprises a device controller.

14. The electronic device according to claim 4, wherein said interface is a USB interface, said predetermined communication is a configuration operation, and said control means comprises a device controller.

15. The electronic device according to claim 5, wherein said interface is a USB interface, said predetermined communication is a configuration operation, and said control means comprises a device controller means comprises a device controller.

16. The electronic device according to claim 6, wherein said interface is a USB interface, said predetermined communication is a configuration operation, and said control means comprises a device controller.

17. The electronic device according to claim 7, wherein said interface is a USB interface, said predetermined communication is a configuration operation, and said control means comprises a device controller.

18. The electronic device according to claim 8, wherein said interface is a USB interface, said predetermined communication is a configuration operation, and said control means comprises a device controller.

19. The electronic device according to claim 9, wherein said interface is a USB interface, said predetermined communication is a configuration operation, and said control means comprises a device controller.

20. The electronic device according to claim 10, wherein said interface is a USB interface, said predetermined communication is a configuration operation, and said control means comprises a device controller.

* * * * *

UNITED STATES PATENT AND TRADEMARK OFFICE
CERTIFICATE OF CORRECTION

PATENT NO. : 7,043,646 B2  
APPLICATION NO. : 10/076593  
DATED : May 9, 2006  
INVENTOR(S) : K. Enami et al.

It is certified that error appears in the above-identified patent and that said Letters Patent is hereby corrected as shown below:

| COLUMN | LINE | ERROR |
|---|---|---|
| Item (56) Title page, col. 2 | Refs. Cited (Other Publs., Item 1) | "Sirial Bus" should read --Serial Bus-- |
| 10 (Claim 15, | 19-20 lines 4-5) | "means comprises a device controller means comprises a device controller" should read --means comprises a device controller-- |

Signed and Sealed this

Twenty-sixth Day of December, 2006

JON W. DUDAS  
*Director of the United States Patent and Trademark Office*